March 24, 1959  R. A. OLERUD  2,879,473
FREQUENCY MEASURING SYSTEM
Filed April 9, 1956  2 Sheets-Sheet 1
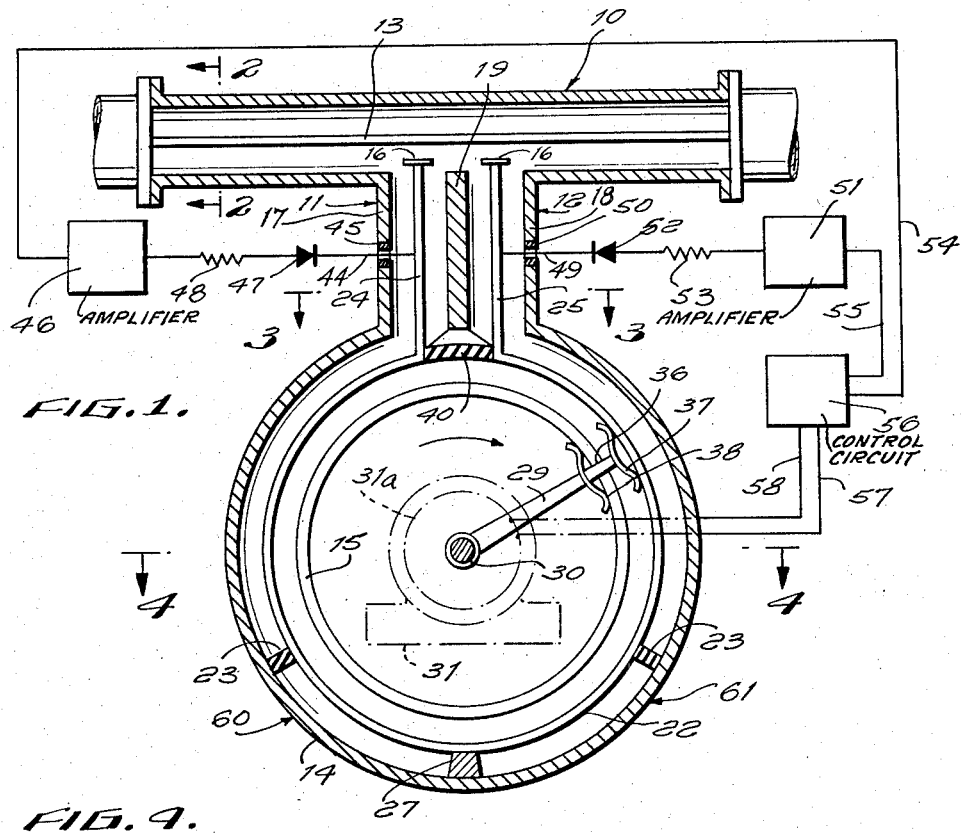
INVENTOR
ROY A. OLERUD
BY
Charles J. Elderkin
ATTORNEY March 24, 1959 R. A. OLERUD 2,879,473
FREQUENCY MEASURING SYSTEM
Filed April 9, 1956
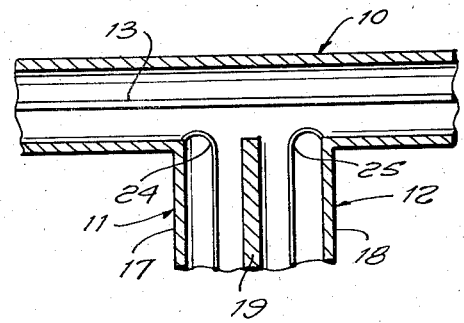
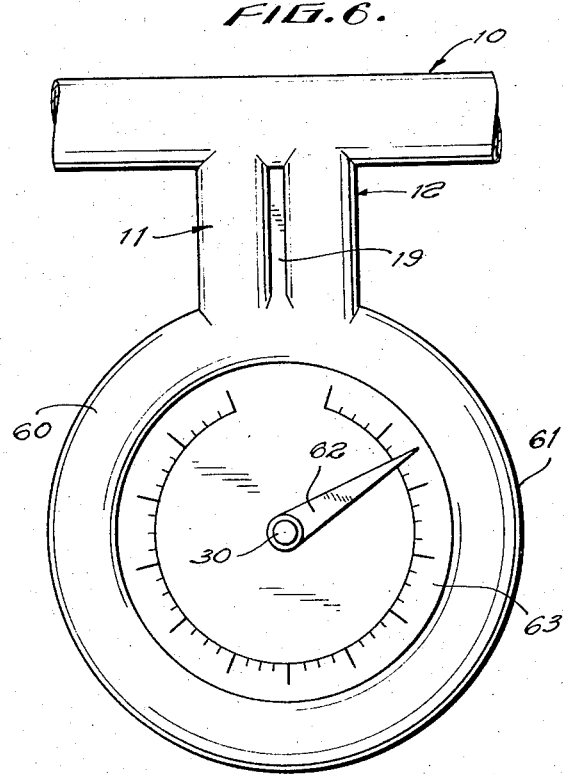
INVENTOR
ROY A. OLERUD
BY
Charles A. Elderkin
ATTORNEY

United States Patent Office 2,879,473
Patented Mar. 24, 1959

2,879,473

FREQUENCY MEASURING SYSTEM

Roy A. Olerud, Maywood, N.J., assignor to Air Associates, Incorporated, Teterboro, N.J., a corporation of New Jersey Application April 9, 1956, Serial No. 576,956

13 Claims. (Cl. 324—81)

This invention relates in general to systems for measuring the frequency of electrical energy carried by transmission lines or wave guides. More particularly, the invention contemplates the provision of frequency measuring systems which are capable of effecting automatic measurements and indications of changes in frequency, the nature of such changes and the quantitative value thereof, such, for example, as to provide data which permit accurate tuning of control elements associated with a transmission line or wave guide to restore or vary frequency conditions in accordance with the frequency of electrical energy supplied to the line.

Various methods have been employed heretofore in the detection and measurement of frequency and frequency variations. Thus, for example, the use of Lissajous patterns on the screen of a cathode-ray oscillograph provides a relatively simple method for comparing two frequencies within the lower frequency ranges. Cycles counters and frequency bridges, such as the so-called "Wien bridge," also find wide application within the lower frequency ranges, as do the so-called "frequency meters" which depend for their indication on the mechanical resonance of vibratory elements, or the electrical resonance of moving coil instruments, or the frequency variation of current distribution between an inductive circuit and a parallel capacitive circuit. Methods which have been employed heretofore for effecting measurements primarily at high frequencies include those involving the use of wave meters, or heterodyning against an oscillator whose frequency is stable and known, or the production and measurement of standing waves in a tuned line, etc.

With the possible exception of certain cheaper forms of cycle counters, vibrating-reed instruments, and the simple R–C networks, all of which are inherently limited to low-frequency, frequency sensing and measurement applications, for the most part, the conventional forms of frequency measuring devices enumerated hereinbefore embody relatively expensive and sensitive instrumentation and are not, therefore, particularly well suited from an economical standpoint for use in permanent installations such as are required for monitoring applications on transmission lines, etc. Furthermore, whereas relatively inexpensive apparatus of the general class described can be achieved through the use of resonant cavities or tuned lines, devices of this type as heretofore known in industry require manual adjustment and are not self-indicating or automatic in operation.

It is, therefore, the principal object of the present invention to provide a frequency sensing and measuring system of relatively simple and inexpensive design which is capable of providing continuous and automatic frequency measuring or monitoring service over virtually an unlimited frequency spectrum and in conjunction with any type of transmission line or similar propagation media.

It is a further object of the invention to provide a frequency measuring device of the general class described which can be employed in conjunction with an independent tunable circuit element or elements to provide data with respect to occurrence, sense and quantum of frequency variations in transmitted electrical energy for corrective tuning or control of said tunable element or elements.

It is a specific object of the invention to provide apparatus which is capable of measuring the frequency of electrical energy carried by a transmission line or within a wave guide, under control of an automatically operable frequency detector which functions in response to the frequency-voltage characteristics of a standing wave.

In its simplest form, the frequency measuring system of the invention comprises in combination with any conventional transmission line, a segment of similar line preferably formed in an arcuate shape with the ends thereof being electrically coupled in any suitable manner to the main transmission line and being short-circuited at its electrical midpoint to provide identical half-sections of resonant line. Associated with the arcuate auxiliary or detector line there is provided a rotatable commutator assembly arranged to short-circuit both conductors of the detector line at various electrical lengths upon motion in one direction around the full circumference of the arcuately disposed lines. The separate short-circuited half-sections of the detector line are each connected through independent signal sensing circuits to a common control circuit whereby signals proportional to the voltage across each half-section of the line are supplied and used to control a prime mover which is mechanically coupled through a clutch to the rotatable commutator assembly in such manner that motion of the commutator on the detector line is arrested when either half of the detector line is short-circuited at a resonant electrical length as represented by a maximum signal or voltage at the frequency of electrical energy then being carried by the main transmission line.

The separate short-circuited half-sections of the detector line, from their short-circuited electrical midpoint to their points of coupling to the main transmission line, are each of electrical lengths at least as long as one-quarter of the wave length of the lowest frequency of electrical energy to be carried by the main transmission line. That is to say, the respective half-sections of the detector line of the device of the invention are adapted to provide resonant conditions when under action of electrical energy of wavelength equal to four times the electrical length of the sections, and, when under action of electrical energy of a different wavelength the device is automatically actuated to search under control of the rotatable short-circuiting commutator for an electrical length on the respective half-sections corresponding to quarter-wave resonance at the frequency involved. Rotation of the variable short-circuiting commutator is effected in one direction only around the arcuately disposed half-sections of the detector line such that rotation on one half-section functions to move the commutator away from the short-circuited electrical midpoint of the two sections thereby effectively shortening that half-section, whereas rotation of the commutator on the opposite half-section is in a direction towards the short-circuited electrical midpoint of the twin sections thereby effectively lengthening that half-section. In this manner, the motion of the commutator relative to its former position on the detector line provides a direct and automatic indication of the nature or sense of a frequency variation occurring on the main transmission line as well as the relative quantum of the variation.

Thus, for example, assuming that the short-circuiting rotatable commutator of the frequency measuring device is positioned at a given point on either one of the half-sections of the detector line which does not correspond to a resonant electrical length for the frequency of electrical energy on the main transmission line, the commutator will commence searching for a resonant electrical length by rotation in one direction under action of the primer mover. Accordingly, if the frequency of transmitted energy is higher than the corresponding frequency represented by the starting position of the commutator on that particular half-section, the motion of the commutator will be arrested on the same half-section, provided the movement of the commutator on the section in question is such as to shorten the section to the proper resonant electrical length corresponding to the increased frequency. If, on the other hand, the increase in frequency occurred while the commutator was stopped on that half-section of the detector line on which the commutator always moves towards the electrical midpoint of the two half-sections, it will be seen that the searching movement of the commutator thereon can only serve to increase the effective electrical length of the half-section, and, accordingly, the commuator must move to the other half-section to find a position of quarter-wave resonance, or, a shorter segment of detector line corresponding to the resonant electrical length at the increased frequency of transmitted energy.

It is believed that the above as well as other features and objects of the invention and the invention itself, may be best understood by reference to the following description of a specific embodiment thereof, taken in conjunction with the accompanying drawings, wherein:

Fig. 1 is a plan view, partly in section and partly in schematic form, showing one embodiment of a complete frequency measuring system of the invention;

Fig. 2 is a cross-sectional view taken along the line 2—2 of Fig. 1 showing the main transmission line of the system illustrated in Fig. 1;

Fig. 3 is a cross-sectional view taken along the line 3—3 of Fig. 1 showing a section of transmission line utilized in interconnecting the main transmission line and the detector line according to the embodiment shown in Fig. 1;

Fig. 4 is a sectional view taken along the line 4—4 of Fig. 1 showing the detector line and associated short-circuiting commutator assembly of the frequency measuring system of the invention;

Fig. 5 is a fragmentary sectional view of a portion of the main transmission line of the system of Fig. 1, illustrating an alternative arrangement for coupling the detector line to the main transmission line; and Fig. 6 is a plan view of the frequency measuring system of Fig. 1 showing the frequency metering device associated with the system.

With reference to the specific embodiment of the invention illustrated in the drawings, it will be noted that the frequency measuring system has been shown in its application for use in conjunction with transmission lines of the coaxial type and the following detailed description of the principles of the invention will also be made with reference to this specific type of application, but it is to be clearly understood that this is done for purposes of illustration only since the invention is equally applicable for use with other types of transmission lines as well as with wave guides.

Referring to Figs. 1 and 2 of the drawings, there is shown in fragmentary section and cross-section, respectively, a main transmission line of conventional coaxial design consisting of an outer tubular conductor 10 and a coaxially disposed inner conductor 13 maintained in coaxial relationship with respect to the outer conductor in any suitable manner, such, for example, as by the use of insulated spacer disks or washers (not shown) distributed along the length of conductor 13. In adapting the frequency measuring system of the invention for use in conjunction with a coaxial line according to the arrangement illustrated in Fig. 1, I provide two short coaxial stub lines 11 and 12 of the same form as the transmission line, per se, having their outer conductors 17 and 18 secured to the outer conductor of the main transmission line and extending at right angles therefrom. Stub lines 11 and 12 are preferably interconnected through their outer conductor surfaces 17 and 18 by means of webbing 19 (Fig. 3), or any similar arrangement.

The opposite ends of stub lines 11 and 12 are interconnected or formed integrally with an arcuately shaped section of coaxial line forming the detector line of the frequency measuring system and consisting of an outer tubular conductor 14 and an inner conductor 22. Outer conductor 14 of the detector line is slotted at any convenient location, such as slot 15 provided around the inner periphery thereof in the arrangement illustrated in the drawings (Fig. 4), to receive the short-circuiting commutator assembly as described hereinafter. The inner conductor 22 of the detector line is maintained in coaxial relationship to the outer conductor 14 in conventional manner by means of insulating spacer washers 23.

The inner conductor 22 of the detector line is electrically connected at its ends to inner conductors 24 and 25 of stub lines 11 and 12, respectively, and conductors 24 and 25 of the stub lines are in turn electrically coupled to the main transmission line in any suitable manner, such as by capacitive coupling through plates 16 secured to the ends thereof and disposed adjacent inner conductor 13 of the main transmission line as shown in Fig. 1, or, the inner conductors 24 and 25 may be inductively coupled to the main transmission line as indicated by the arrangement shown in Fig. 5. The coupling is such as to supply a small but definite portion of the transmitted energy from the main transmission line to the detector line.

The inner conductor 22 of the arcuate detector line is grounded at its electrical midpoint in any suitable manner, preferably by means of a shorting element 27 interconnecting the inner conductor 22 and outer conductor 14 of the coaxial line as illustrated in Fig. 1. Shorting element 27 divides the detector line into two separate resonant half-sections of semi-circular configuration, as designated by reference numerals 60 and 61 in the drawings, each being of equal electrical length and each extending from the ground point at shorting element 27 to the points of coupling to the main transmission line. The electrical length of each half-section of the detector line, including the length of the stub lines where such are employed, should be at least as long as one-quarter of the wave length of the lowest frequency of electrical energy to be carried on the main transmission line in order to insure quarter-wave resonance and consequent measurement for electrical energy transmitted at such a frequency. In addition, where stub lines are employed in coupling the detector half-sections to the main transmission line, such as in the specific embodiment of the invention which is illustrated in the drawings, it is essential that the electrical length of the respective stub lines be not longer than one-quarter of the wavelength of the highest frequency of electrical energy carried by the main transmission line in order to insure that at such higher frequencies the quarter-wave resonant point will be found in the arcuate portion of the detector line rather than in the stub lines.

In order to vary the electrical length of the respective half-sections 60 and 61 of the arcuate detector line, I provide a rotatable short-circuiting commutator assembly consisting of a shorting stub 36 carried at the end of an insulated arm 29 and extending within the slot 15 formed in the outer conductor 14 of the detector line. A pair of shorting brushes 37 and 38 are mounted on shorting stub 36 and are adapted to contact inner conductor 22 and outer conductor 14, respectively, of the coaxial detector line thereby shorting the conductors to each other, as best seen by reference to Fig. 4. The slot 15 in conductor 15 may be recessed as indicated by reference numeral 39 in Fig. 4 to provide a suitable track for shorting brush 38, whereas shorting brush 37 is preferably shaped to engage inner conductor 22 of the detector line. The insulated arm 29 carrying the short-circuiting commutator assembly is mounted on a shaft 30 which is positioned within the center of the annulus or torus defined by the detector line and is adapted to be driven by a motor 31. A clutch 31-a is provided between shaft 30 and motor 31 for coupling the shaft and commutator assembly carried thereon to the motor. The shaft 30 carrying the short-circuiting commutator assembly is mounted in bearings 32 and 33 which are secured within spaced parallel circular supporting plates 34 and 35 mounted on the top and bottom of the outer conductor 14 of the detector line. In order to complete the circular path otherwise defined by inner conductor 22, thereby facilitating movement of the short-circuiting commutator assembly from one half-section of the detector line to the other, a short insulated block 40 is secured to web 19 connecting stub lines 11 and 12 and extends between the respective half-sections of inner conductor 22 at the junctions with conductors 24 and 25 of the stub lines.

The control circuit of the frequency measuring system comprises a pair of leads 44 and 49 coupled to inner conductors 24 and 25, respectively, of stub lines 11 and 12 and extending through insulating gromets 45 and 50 mounted in the outer conductors of the stub lines. In series with leads 44 and 49, respectively, there are connected identical detectors 47 and 52, limiting resistors 48 and 53, and amplifiers 46 and 51. The outputs of amplifiers 46 and 51 are connected by leads 54 and 55, respectively, to a control circuit 56 which is in turn connected by leads 57 and 58 to the clutch 31-a which may be of conventional electromechanical design. In the embodiment of the invention illustrated in the drawings clutch 31-a is normally engaged, coupling shaft 30 and the short-circuiting commutator assembly carried thereon to motor 31 thereby rotating the commutator continuously in one direction, and is adapted to be disengaged to arrest the motion of the commutator assembly in response to a signal from control circuit 56 passed by either of detectors 47 or 52 and associated circuitry by reason of a condition of maximum voltage occurring on one of the half-sections of the detector line when the commutator reaches a point on the section which corresponds to the proper electrical length for quarter wave resonance at the frequency of electrical energy being carried on the main transmission line. Of course, clutch 31-a could also be of the normally disengaged type. Associated with shaft 30 in fixed alignment with the short-circuiting commutator assembly and adapted to be rotated therewith is a pointer 62, which, in cooperation with a calibrated dial 63 mounted on plate 34, functions to provide a direct reading of the frequency of signal energy on the main transmission line.

In operation, wave energy on the main transmission line will be picked up by stub lines 11 and 12 and passed to each half-section of the detector line. Assuming for purposes of explanation that the short-circuiting commutator assembly is in the position as shown in Fig. 1, i.e., about one-third of the distance along the length of half-section 61 (unidirectional drive in a clockwise direction), and that this position does not correspond to quarter wave resonance at the frequency of electrical energy carried on the main transmission line, clutch 31-a will re-engage shaft 30 to motor 31 causing the commutator assembly to commence searching in a clockwise direction.

Provided the wavelength of transmitted intelligence is longer than the corresponding electrical length represented by the starting point of the commutator assembly, indicating a decrease in frequency, the new resonant length will be found on the same half-section (61) of the detector line since rotation of the commutator assembly in a clockwise direction on section 61 effectively lengthens this resonant line, and the commutator assembly will be arrested at the proper new resonant point on section 61. Accordingly, both the sense and quantum of the new frequency are readily ascertainable by an observer with reference to the former position of the commutator assembly. Provided the new wave length is shorter than the commutator position shown in Fig. 1, indicating an increase in frequency, quarter wave resonance will not be found on half-section 61 which increases in electrical length as the short-circuiting commutator assembly commences searching, but rather, the commutator will pass beyond the short-circuited electrical midpoint of the detector line onto half-section 60 where it will be arrested after shortening this half-section to the appropriate electrical length. Again, the dial reading will establish both the sense and quantum of the change in frequency of energy on the main transmission line by reference to the former position of the short-circuiting commutator. In a similar manner, if the commutator assembly is in a position on line 60 and there is a rise and then a fall in frequency, the commutator will initially move up to shorten the electrical length of half-section 60 (increase) but will then move to half-section 61 for a position of quarter-wave resonance for the decreased frequency. If instead, there is first a fall and then a rise in frequency with the commutator starting from a position on half-section 60, it will first move to half-section 61 searching for a longer electrical length (decrease) and will then move back to half-section 60 for a position of quarter-wave resonance corresponding to the increased frequency of transmitted intelligence. Similar but reverse conditions prevail when the commutator assembly starts its searching movement from half-section 61.

As will be readily apparent to those skilled in the field of communications, the frequency measuring system of the invention provides a great deal more information than is obtainable with conventional systems employing single resonant lines, and, functions to supply such information on an entirely automatic basis. While the system may be employed in conjunction with audio, radio and UHF frequency spectra, it is particularly useful for measurement work in the UHF spectrum where high frequency distribution effects limit the accuracy and effectiveness of other systems of measurement.

While I have described and illustrated a specific embodiment of my invention, it is to be understood that numerous changes and modifications can be made in the foregoing structures without departing from the true scope of the invention which is more accurately defined within appended claims.

We claim:

1. A system for continuously measuring the frequency of electrical energy on a transmission line comprising a resonant detector line electrically coupled to said transmission line, movable searching means associated with said detector line and operative to continuously vary the electrical length of said line, means electrically connected to said searching means and controlled by wave energy on said transmission line for arresting motion of said searching means at a point on said detector line of electrical length corresponding to quarter wave resonance at the frequency of electrical energy on said transmission line, and indicator means mechanically coupled to said searching means for indicating the frequency corresponding to the resonant point on said detector line.

2. The system for continuously measuring the frequency of electrical energy on a transmission line as claimed in claim 1, wherein said movable searching means is moved on said detector line in one direction only, the detector line being sub-divided into two electrically equal half-sections whereby the direction of variations in the frequency of electrical energy on said transmission line is indicated with reference to a former position of the searching means on the detector line by the particular half-section on which motion of the searching means is arrested at a resonant electrical length.

3. The system for continuously measuring the frequency of electrical energy on a transmission line as claimed in claim 1, wherein said detector line is formed in an arcuate shape and is short-circuited at its electrical midpoint to form two electrically equal half-sections of resonant line, said movable searching means comprising a rotatable commutator arranged to short-circuit said detector line at various electrical lengths and being rotated around said arcuate detector line in one direction only, whereby the direction of variations in the frequency of electrical energy on said transmission line is indicated with reference to a former position of said short-circuiting commutator on the detector line by the particular half-section on which motion of the commutator is arrested at a resonant electrical length.

4. A system for continuously measuring the frequency of an electrical wave in a transmission line comprising, a detector line formed in an arcuate shape with both ends electrically coupled to said transmission line and being short-circuited at its electrical mid-point to form two half-sections of resonant line, rotatable commutator means positioned to short-circuit said detector line, drive means mechanically coupled to said rotatable commutator means for moving said rotatable commutator in a continuous manner around the arcuately-shaped detector line to short-circuit the same at various electrical lengths, voltage sensing means electrically connected to said detector line for sensing resonance in each half-section thereof, and control means having an input circuit electrically connected to said voltage sensing means and an output circuit electrically connected to said drive means and operable on said drive means to arrest the rotation of said commutator when either half-section of said detector line is short-circuited at a resonant electrical length in accordance with the frequency of the electrical wave on said transmission line.

5. The frequency measuring system as claimed in claim 4, wherein said detector line is inductively coupled to said transmission line.

6. The frequency measuring system as claimed in claim 4, wherein said detector line is capacitively coupled to said transmission line.

7. The frequency measuring system as claimed in claim 4, and further comprising an indicator mechanically coupled to said rotatable commutator and a calibrated dial associated therewith for providing a visual indication of the frequency corresponding to various electrical lengths of said detector line.

8. A system for continuously measuring the frequency of an electrical wave in a transmission line comprising, a coaxial line formed in an arcuate manner having both ends electrically coupled to said transmission line and short-circuited at its electrical mid-point to form two half-sections of resonant line, rotatable contactor means positioned axially with respect to said arcuate coaxial line and carrying contactor elements for short-circuiting at corresponding electrical lengths both conductors of said coaxial line, drive means mechanically coupled to said rotatable contactor means for moving said contactor means to short-circuit said coaxial line at varying distances from the ends thereof, voltage sensing means electrically connected to said coaxial line for detecting resonance in both half-sections of said line, and control means electrically connected to and actuated by said sensing means and operable through an electrical connection with said drive means to arrest the rotation of said contactor means when either half-section of said coaxial line is short-circuited at a resonant length.

9. The system for continuously measuring the frequency of an electrical wave in a transmission line as claimed in claim 8, wherein said arcuately formed coaxial line is coupled to said transmission line through two coaxial stub-lines of substantially equal electrical length, being shorter than one-quarter of the wavelength of the highest frequency to be measured by said system.

10. A system for continuously measuring the frequency of an electrical wave in a transmission line comprising, a coaxial line formed in an arcuate manner having both ends electrically coupled to said transmission line and short-circuited at its electrical mid-point to form two half-sections of resonant line, rotatable contactor means positioned axially with respect to said arcuate coaxial line and carrying contactor elements for short-circuiting at corresponding electrical lengths both conductors of said coaxial line, drive means mechanically coupled to said rotatable contactor means for moving said contactor means unidirectionally to short-circuit said coaxial line at varying distances from the ends thereof, voltage sensing means electrically connected to both half-sections of said coaxial line for detecting voltages developed across each half-section thereof, and control means electrically connected to and actuated by said sensing means and operable through an electrical connection with said drive means to arrest the rotation of said contactor means when either half-section of said coaxial line is short-circuited at a resonant length.

11. A system for continuously measuring and indicating the frequency of an electrical wave in a transmission line comprising, a coaxial line formed in an arcuate manner having both ends electrically coupled to said transmission line and short-circuited at its electrical mid-point to form two half-sections of resonant line, rotatable contactor means positioned axially with respect to said arcuate coaxial line and carrying contactor elements for short-circuiting at corresponding electrical lengths both conductors of said coaxial line, drive means mechanically coupled to said rotatable contactor means for moving said contactor means to short-circuit said coaxial line at varying distances from the ends thereof, voltage sensing means electrically connected to said coaxial line for detecting resonance in both half-sections of said coaxial line, control means electrically connected to and actuated by said sensing means and operable through an electrical connection with said drive means to arrest the rotation of said contactor means when either half-section of said coaxial line is short-circuited at a resonant length, and frequency indicating means mechanically connected to said rotatable contactor means including a dial calibrated in frequency units and cooperating with said rotatable contactor means for indicating the resonant frequency.

12. A system for continuously measuring and indicating the frequency of an electrical wave in a transmission line comprising, a slotted coaxial line formed in an arcuate manner having both ends electrically coupled to said transmission line and short-circuited at its electrical mid-point to form two half-sections of resonant line, rotatable contactor means associated with said slotted coaxial line and passing through said slot for short-circuiting at corresponding electrical lengths both conductors of said coaxial line, drive means mechanically connected to said rotatable contactor means for moving said contactor means unidirectionally to short-circuit said coaxial line at varying distances from the ends thereof, voltage sensing means electrically connected to both half-sections of said coaxial line for developing rectified output signals proportional to the voltage across each half-section thereof, electrical control means electrically connected to and actuated by said rectified output signals and operable through an electrical connection to said drive means to arrest the rotation of said contactor means when either half-section of said coaxial line is short-circuited at a resonant length, and frequency indicating means including a dial calibrated in frequency units mechanically coupled to said rotatable contactor means for indicating the resonant frequency.

13. The system for continuously measuring and indicating the frequency of an electrical wave in a transmission line as claimed in claim 12, wherein said drive means comprises a unidirectional motor and clutch and wherein said electrical control means arrests the rotation of said rotating contactor means by disengaging said clutch when either half-section of said coaxial line is short-circuited at a resonant length.

References Cited in the file of this patent
UNITED STATES PATENTS 2,400,597   Peterson _____ May 21, 1946